(12) United States Patent
Martinez et al.

(10) Patent No.: US 12,078,426 B2
(45) Date of Patent: *Sep. 3, 2024

(54) CONTOURED WALL HEAT EXCHANGER

(71) Applicant: General Electric Company, Schenectady, NY (US)

(72) Inventors: Ramon Martinez, Fairfield, OH (US); Nicolas Kristopher Sabo, West Chester, OH (US); Curt Edward Hogan, West Chester, OH (US); Michael Stephen Popp, Kings Park, NY (US); Jeffrey Douglas Rambo, Mason, OH (US); Jared Matthew Wolfe, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/190,310

(22) Filed: Mar. 27, 2023

(65) Prior Publication Data

US 2023/0228494 A1    Jul. 20, 2023

Related U.S. Application Data

(60) Continuation of application No. 17/074,212, filed on Oct. 19, 2020, now abandoned, which is a division of
(Continued)

(51) Int. Cl.
*F28D 7/00*  (2006.01)
*F28F 7/02*  (2006.01)
(Continued)

(52) U.S. Cl.
CPC .............. *F28D 7/0033* (2013.01); *F28F 7/02* (2013.01); *F28F 9/0265* (2013.01);
(Continued)

(58) Field of Classification Search
CPC .. F28D 7/0033; F28D 2021/0026; F28F 7/02; F28F 9/0265; F28F 9/0268; F28F 13/12; F28F 2009/0287; F28F 2255/18
(Continued)

(56) References Cited

U.S. PATENT DOCUMENTS 2,469,028 A    5/1949 Belaieff
2,656,159 A    10/1953 Holm et al.
(Continued)

FOREIGN PATENT DOCUMENTS

CN    206321103    7/2017
CN    205209293    5/2019
(Continued)

OTHER PUBLICATIONS

Australian Patent Office, "Examination Report," issued in connection with Australian Patent application No. 2018260943, Aug. 20, 2019, 5 pages.
(Continued)

*Primary Examiner* — Joel M Attey
(74) *Attorney, Agent, or Firm* — Dinsmore & Shohl LLP

(57) ABSTRACT

A heat exchanger and heat exchanger core are provided. The heat exchanger core includes a plurality of columnar passages extending between an inlet plenum of the heat exchanger core and an outlet plenum of the heat exchanger core, the columnar passages formed monolithically in a single fabrication process.

20 Claims, 8 Drawing Sheets

Related U.S. Application Data application No. 15/816,499, filed on Nov. 17, 2017, now Pat. No. 10,809,007.

(51) Int. Cl.
| | |
|---|---|
| *F28F 9/02* | (2006.01) |
| *F28F 13/12* | (2006.01) |
| *F28D 21/00* | (2006.01) |

(52) U.S. Cl.
CPC ............ *F28F 9/0268* (2013.01); *F28F 13/12* (2013.01); *F28D 2021/0026* (2013.01); *F28F 2009/0287* (2013.01); *F28F 2255/18* (2013.01)

(58) Field of Classification Search
USPC ...................................................... 165/109.1
See application file for complete search history.

(56) References Cited

U.S. PATENT DOCUMENTS

| | | | |
|---|---|---|---|
| 3,118,498 | A | 1/1964 | Bergdoll et al. |
| 3,272,260 | A | 9/1966 | Raub et al. |
| 3,460,611 | A | 8/1969 | Folsom et al. |
| 4,265,302 | A | 5/1981 | Forster et al. |
| 4,271,110 | A | 6/1981 | Minjolle |
| 4,746,479 | A | 5/1988 | Hanaki et al. |
| 4,811,719 | A | 3/1989 | Baumann |
| 5,458,187 | A | 10/1995 | Davis |
| 5,590,708 | A | 1/1997 | Ulrich |
| 6,221,463 | B1 | 4/2001 | White |
| 7,285,153 | B2 | 10/2007 | Bruun et al. |
| 8,211,377 | B2 | 7/2012 | Caze et al. |
| 8,228,675 | B2 | 7/2012 | Koplow |
| 8,387,362 | B2 | 3/2013 | Storage et al. |
| 8,770,269 | B2 | 7/2014 | Scott |
| 10,495,384 | B2 | 12/2019 | Rock, Jr. et al. |
| 10,809,007 | B2 | 10/2020 | Martinez et al. |
| 2013/0174924 | A1 | 7/2013 | Luo et al. |
| 2014/0140829 | A1 | 5/2014 | Blair et al. |
| 2015/0007969 | A1 | 1/2015 | Pal |
| 2016/0003552 | A1 | 1/2016 | Chordia et al. |
| 2016/0054071 | A1 | 2/2016 | Cordova et al. |
| 2016/0084584 | A1 | 3/2016 | Stapp |
| 2016/0131434 | A1 | 5/2016 | Noishiki et al. |
| 2016/0131441 | A1 | 5/2016 | Newman et al. |
| 2016/0178287 | A1* | 6/2016 | Karlen .................... F28F 1/405 165/181 |
| 2017/0089643 | A1 | 3/2017 | Arafat |
| 2017/0146305 | A1* | 5/2017 | Kuczek ................. F28F 9/0268 |
| 2017/0198977 | A1 | 7/2017 | Herring et al. |
| 2017/0198978 | A1 | 7/2017 | Kuczek et al. |
| 2017/0211893 | A1* | 7/2017 | Noishiki ............... F28D 9/0037 |
| 2017/0292791 | A1 | 10/2017 | Zaffeti et al. |

FOREIGN PATENT DOCUMENTS

| | | |
|---|---|---|
| DE | 19653989 | 6/1998 |
| EP | 2706320 | 3/2014 |
| EP | 3124906 | 2/2017 |
| EP | 3173724 | 5/2017 |
| JP | S60141541 | 12/1983 |
| JP | 60228895 | 4/1984 |
| JP | H0365263 A | 3/1991 |
| JP | 2000193390 A | 7/2000 |
| JP | 2006220319 | 2/2005 |
| JP | 2005315518 | 11/2005 |
| JP | 2011133198 | 7/2011 |
| JP | 2017-032271 | 2/2017 |
| WO | 2016057443 | 4/2016 |
| WO | 2017008108 | 1/2017 |
| WO | 2017052798 | 3/2017 |
| WO | 2018117949 | 6/2018 |

OTHER PUBLICATIONS

Korean Patent Office, "Office action," issued in connection with Korean patent application No. 10-2018-0139696, mailed on Mar. 18, 2020, 5 pages. English translation not available.

Japanese Patent Office,"Office action," issued in connection with Japanese patent office No. 2018-213380, mailed on Feb. 3, 2020, 15 pages.

Chinese Patent Office, "Office action," issued in connection with Chinese patent application No. 201811366725.7, mailed on Mar. 4, 2020, 8 pages.

Canadian Patent Office, "Notice of Allowance," issued in connection with U.S. Appl. No. 3,023,538, mailed on May 7, 2020, 1 page.

European Patent Office, "Communication pursuant to article 94(3)," issued in connection with EP patent application No. 18206316.4, mailed on Jul. 2, 2020, 4 pages.

United States Patent and Trademark Office, "Non-final office action," issued in connection with U.S. Appl. No. 15/816,499, mailed on Feb. 12, 2020, 20 pages.

United States Patent and Trademark Office, "Advisory action," issued in connection with U.S. Appl. No. 15/816,499, mailed on Jan. 17, 2020, 12 pages.

United States Patent and Trademark Office, "Notice of Allowance," issued in connection with U.S. Appl. No. 15/816,499, mailed on Jun. 18, 2020, 28 pages.

United States Patent and Trademark Office, "Final Office action," issued in connection with U.S. Appl. No. 15/816,499, mailed on Oct. 29, 2019, 17 pages.

United States Patent and Trademark Office, "Non-final office action," issued in connection with U.S. Appl. No. 15/816,499, mailed on Mar. 27, 2019, 12 pages.

United States Patent and Trademark Office, "Requirement for Restriction," issued in connection with U.S. Appl. No. 15/816,499, mailed on Oct. 17, 2018, 6 pages.

Korean Patent Office, "Notice of Final Rejection," issued in connection with korean patent application No. 10-2018-0139696, Oct. 25, 2020, 8 pages.

Australian Patent Office, "Notice of Acceptance," issued in connection with Australian patent application No. 2018260943, Jul. 13, 2020, 3 pages.

Chinese Patent Office, "Second Office action," issued in connection with Chinese patent application No. 201811366725.7, Oct. 22, 2020, 7 pages.

Japanese Patent Office, "Office action," issued in connection with Japanese patent application No. 2018-213380, Jul. 27, 2020, 9 pages.

Chinese Patent Application No. 201811366725.7 Office Action, Apr. 16, 2021 (11 pages with English Translation).

European Patent Application No. 18206316.4 Office Action, Apr. 12, 2021 (4 pages).

Japanese Patent Application No. 2018-213380 Office Action, Jun. 24, 2021 (13 pages with English Translation).

Koren Patent Application No. 10-2021-0016871 Office Action, Apr. 28, 2021 (8 pages with English Translation).

Extended European Search Report for Application No. 23184327.7 dated Nov. 22, 2023 (7 pages).

* cited by examiner

CONTOURED WALL HEAT EXCHANGER

CROSS-REFERENCE TO RELATED APPLICATIONS

This patent claims priority as a continuation to U.S. Non-Provisional application Ser. No. 17/074,212 filed Oct. 19, 2020, which is a divisional to U.S. Non-Provisional application Ser. No. 15/816,499 (now U.S. Pat. No. 10,809,007), entitled "CONTOURED WALL HEAT EXCHANGER" which was filed on Nov. 17, 2017, and is hereby incorporated herein by reference in its entirety.

BACKGROUND

The field of the disclosure relates generally to gas turbine engines and, more particularly, to a monolithically formed heat exchanger having contoured walls.

At least some known heat exchange devices use separate parallel plates and multiple pieces, such as orifice plates, to allow supply and extraction from assembled structures. The separate plates need to be sealed by welding, brazing or by incorporating bolted and sealed flanges. Such separately assembled structures include a risk of leakage, leading to mixing of the working fluid and the cooling fluid or a loss of one or both of the fluids. Misassembly of the separate components of the heat exchanger may cause leakage problems. Additional maintenance is performed to periodically verify the integrity of the heat exchanger fluid passages. Moreover, additional spare part inventory may be necessary for components of the heat exchanger that wear over time, such as, but not limited to, seals. Heat exchanger packaging is typically not easily adjustable for different applications due to the limited configurations of heat exchanger components due to manufacturability concerns. Additionally, it is difficult to channel the working fluid and the cooling fluid to their respective heat exchanger fluid passages in in the core of counter-flow heat exchangers because of the complex geometries involved in splitting the flow in the inlet plenum and joining the flow in the outlet plenum.

BRIEF DESCRIPTION

In one embodiment, a heat exchanger core includes a plurality of columnar passages extending between an inlet plenum of the heat exchanger core and an outlet plenum of the heat exchanger core, the columnar passages formed monolithically in a single fabrication process.

Optionally, the plurality of columnar passages each comprise a pair of adjacent sidewalls separated by a flow gap. Also optionally, at least one sidewall of the pair of adjacent sidewalls includes a plurality of surface features that extend into the flow gap. The plurality of columnar passages may include a first set of first passages coupled in parallel flow communication and a second set of second passages coupled in parallel flow communication wherein the second set of second passages is isolated from flow communication with the first set of first passages. A third set of third passages may be coupled in parallel flow communication, and the third set of third passages may be isolated from flow communication with the first set of first passages and the second set of second passages. Optionally, at least one of the first set of first passages and the second set of second passages include individual core flow passages that are sized differently than the remaining core flow passages of the at least one of the first set of first passages and the second set of second passages. The first set of first passages and the second set of second passages may be coupled in thermal conductive communication with each other along a length of the first set of first passages and the second set of second passages between the inlet plenum of the heat exchanger core and the outlet plenum of the heat exchanger core. Optionally, the plurality of columnar passages includes a plurality of non-planar sidewalls. Also optionally, the plurality of columnar passages includes at least one of a plurality of flow guides, a plurality of dimples, a plurality of bumps, and a plurality of spikes. The heat exchanger core may further include a first heat exchanger manifold and a second heat exchanger manifold, wherein a transition member is formed on each end of at least one of the first heat exchanger manifold and the second heat exchanger manifold, and the transition member may include a plurality of guide vanes configured to direct a flow of fluid from the at least one of the first heat exchanger manifold and the second heat exchanger manifold to respective passages of the plurality of columnar passages.

In another embodiment, a heat exchanger includes a heat exchanger body that includes a first heat exchanger manifold, a second heat exchanger manifold, a plurality of working fluid passages extending along a serpentine path between the first heat exchanger manifold and the second heat exchanger manifold, and a plurality of coolant fluid passages extending along the serpentine path in thermal conduction contact with the plurality of working fluid passages. The first heat exchanger manifold, the second heat exchanger manifold, the plurality of working fluid passages, and the plurality of coolant fluid passages are formed monolithically of a sintered material.

Optionally, the serpentine path comprises at least one of a simple arcuate path, a complex arcuate path, a zig-zag path, an undulating path, a straight path, a linear path, and combinations thereof. Also optionally, the first heat exchanger manifold includes a working fluid inlet header and a coolant fluid outlet header, wherein the second heat exchanger manifold may include a working fluid outlet header and a coolant fluid inlet header. Also optionally, the first heat exchanger manifold includes a working fluid inlet header and a working fluid outlet header and the second heat exchanger manifold includes a coolant fluid outlet header and a coolant fluid inlet header. Optionally, a first header member is formed monolithically with the heat exchanger body, the first header member includes a first opening, a second opening, and a working fluid plenum extending therebetween, and the first header member includes a third opening, a fourth opening, and a coolant fluid plenum extending therebetween. Also optionally, the heat exchanger includes a second header member formed monolithically with the heat exchanger body, the second header member includes a first opening, a second opening, and a working fluid plenum extending therebetween, and the second header member includes a third opening, a fourth opening, and a coolant fluid plenum extending therebetween. The first heat exchanger manifold, the second heat exchanger manifold, the plurality of working fluid passages, and the plurality of coolant fluid passages may be formed together seallessly. Optionally, at least one of the first heat exchanger manifold and second heat exchanger manifold comprises a flange monolithically formed with the at least one of the first heat exchanger manifold and second heat exchanger manifold.

In yet another embodiment, a heat exchanger includes a heat exchanger body that includes a first heat exchanger manifold including a monolithically formed flange, a second heat exchanger manifold including a monolithically formed flange, and a plurality of sidewalls extending along an at least partially arcuate path between the first heat exchanger manifold and the second heat exchanger manifold. The plurality of sidewalls are separated by a flow gap forming a plurality of working fluid passages alternating with a plurality of coolant fluid passages in thermal conduction communication with the plurality of working fluid passages. The first heat exchanger manifold, the second heat exchanger manifold, and the plurality of sidewalls are monolithically formed of a sintered material.

Optionally, the sintered material includes any of an elemental metal, a metal alloy, a ceramic, a plastic, and any combination thereof. Also optionally, the sintered material includes at least one of a sintered structure and a partial sintered structure. The first heat exchanger manifold and flange, the second heat exchanger manifold and flange, the plurality of working fluid passages, and the plurality of coolant fluid passages may be formed together seallessly. At least one of the plurality of sidewalls may comprise a plurality of surface features that increase heat transfer between the plurality of working fluid passages and the plurality of coolant fluid passages through at least one of flow mixing, turbulation, and fin effect. At least one of the plurality of sidewalls may include a plurality of surface features that extend into the flow gap, and the plurality of surface features may be formed of at least one of a plurality of flow guides, a plurality of dimples, a plurality of bumps, and a plurality of spikes.

BRIEF DESCRIPTION OF THE DRAWINGS

FIG. 1 is a schematic cross-sectional view of a gas turbine engine in accordance with an exemplary embodiment of the present disclosure.

FIG. 2 is a perspective view of the heat exchanger shown in FIG. 1 having a heat exchanger body.

FIG. 3 is a partial cutaway view of the heat exchanger shown in FIG. 1.

FIG. 4 is a cutaway view of the internal passages of the second heat exchanger manifold shown in FIG. 2.

FIG. 5 is an enlarged cutaway view of the internal passages of second heat exchanger manifold shown in FIG. 2.

FIG. 6 is a perspective view of another embodiment of a heat exchanger having a heat exchanger body.

FIG. 7 is a cutaway view of the heat exchanger (shown in FIG. 6) taken along line 7-7.

FIG. 8 is a cutaway view of a first manifold of the heat exchanger shown in FIG. 6.

Figure 1:
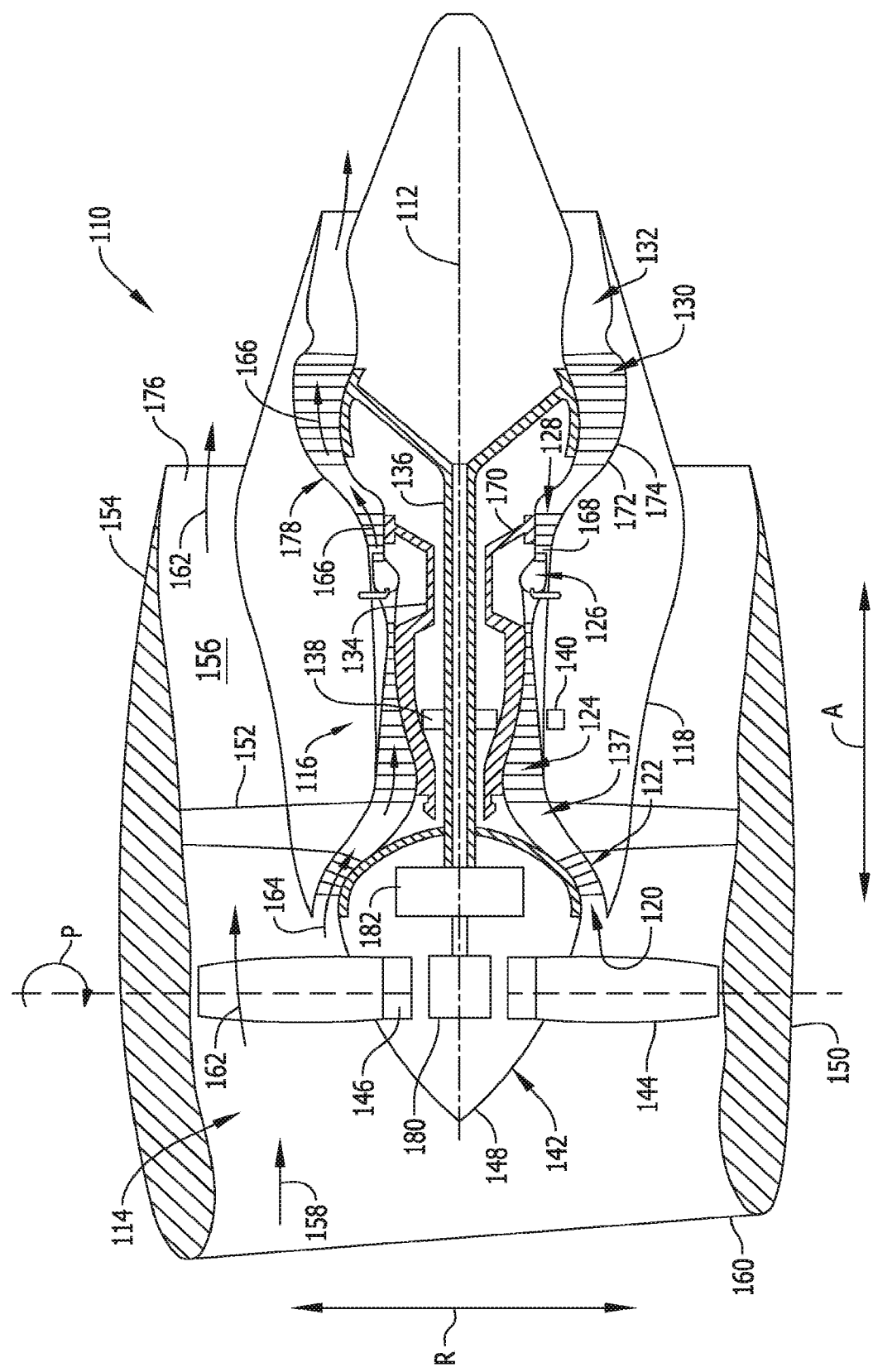
FIGS. 1-8 show example embodiments of the apparatus described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to various embodiments of manufacturing and operating a monolithically formed sealless heat exchanger suitable for use in industrial, commercial, and residential applications. As used herein, "monolithically formed" refers to components or structures that are formed or cast as a single piece.

Embodiments of a heat exchanger system are described herein. The heat exchanger system is embodied in a monolithically formed heat exchanger that may be configured with a header/manifold for supplying and/or returning at least two different fluid streams to a patterned channel arrangement. A set of parallel contoured walls separate the fluid streams, provide structural integrity and increase surface area for heat exchange. Monolithically formed guide vanes carry flow to and from the monolithic channel arrangement. The single piece design eliminates the need of sealing separate parts or components through welding, brazing or bolting.

The monolithically formed heat exchanger design allows heat exchange between at least two fluid streams while increasing the surface area exposed between the fluid streams. The contoured walls increase surface area while providing structural integrity to the monolithically formed heat exchanger. The guide vanes direct the fluid streams into and out of the contoured wall arrangement and may be spaced to improve the pressure vessel capability of the unit to handle pressure differentials. The heat exchanger design allows heat exchange while preventing mixing of the distinct fluid streams.

A patterned, checkered or staggered arrangement of channels is a compact and efficient way to allow two or more fluid streams to exchange heat. The heat exchanger described herein is configurable as a header/manifold to allow supply or extraction of at least two fluid streams from a patterned channel arrangement. The monolithically formed contoured walls conform to the perimeter of the channel arrangement pattern to, in some embodiments, optimize package size and maximize surface area for heat exchange.

Monolithically formed guide vanes are a multi-functional design feature. They carry flow into and out of the patterned channel array, maximize surface area for heat exchange, provide structural strength and pressure vessel capability to the contoured walls and provide support for ease of manufacturing of the monolithically formed heat exchanger.

The heat exchanger described herein permits the supply and the extraction of at least two different fluid streams from a patterned channel arrangement in a monolithically formed design. Prior art requires the use of separate parallel plates and multiple pieces such as orifice plates to allow supply and extraction from heat exchanger structures. Separate plates need to be sealed by welding, brazing or by incorporating bolted and sealed flanges. A risk for leakage leading to mixing of the fluids is reduced by the use of monolithically formed structures. A risk for seal wear or misassembly is eliminated on monolithically formed designs. Heat exchanger packaging is optimized by an increase of the total surface area available for heat exchange through the use of monolithically formed contoured walls.

The following description refers to the accompanying drawings, in which, in the absence of a contrary representation, the same numbers in different drawings represent similar elements.

FIG. 1 is a schematic cross-sectional view of a gas turbine engine in accordance with an exemplary embodiment of the present disclosure. In the exemplary embodiment, the gas turbine engine is embodied as a high-bypass gas turbine engine 110. As shown in FIG. 1, gas turbine engine 110 defines an axial direction A (extending parallel to a longitudinal centerline 112 provided for reference) and a radial direction R (extending perpendicular to longitudinal centerline 112). In general, gas turbine engine 110 includes a fan case assembly 114 and a gas turbine engine core 116 disposed downstream from fan case assembly 114.

Gas turbine engine core 116 includes an approximately cylindrical or tubular outer casing 118 that defines an annular inlet 120. Outer casing 118 encases, in a serial flow relationship, a compressor section including a booster or low pressure (LP) compressor 122 and a high pressure (HP) compressor 124; a combustion section 126; a turbine section including a high pressure (HP) turbine 128 and a low pressure (LP) turbine 130; and an exhaust nozzle section 132. A high pressure (HP) spool or shaft 134 drivingly connects HP turbine 128 to HP compressor 124. A low pressure (LP) spool or shaft 136 drivingly connects LP turbine 130 to LP compressor 122. Each shaft 134 and 136 is supported by a plurality of bearing assemblies 138 coupled in flow communication to a heat exchanger 140 configured to receive a flow of oil from plurality of bearing assemblies 138, to cool the oil using for example, fuel, and to return the oil to the plurality of bearing assemblies 138. LP compressor 122, HP compressor 124, combustion section 126, HP turbine 128, LP turbine 130, and exhaust nozzle section 132 together define a core air flow path 137.

In the exemplary embodiment, fan case assembly 114 includes a fan 142 having a plurality of fan blades 144 coupled to a disk 146 in a spaced apart manner. As depicted, fan blades 144 extend outwardly from disk 146 generally along radial direction R. Fan blades 144 and disk 146 are together rotatable about longitudinal centerline 112 by LP shaft 136.

Referring still to the exemplary embodiment of FIG. 1, disk 146 is covered by rotatable front hub 148 aerodynamically contoured to promote an airflow through plurality of fan blades 144. Additionally, exemplary fan case assembly 114 includes an annular fan casing or outer nacelle 150 that circumferentially surrounds fan 142 and/or at least a portion of gas turbine engine core 116. It should be appreciated that outer nacelle 150 may be configured to be supported relative to gas turbine engine core 116 by an outlet guide vane assembly 152. Moreover, a downstream section 154 of outer nacelle 150 may extend over an outer portion of gas turbine engine core 116 so as to define a bypass airflow passage 156 therebetween.

During operation of gas turbine engine 110, a volume of air 158 enters gas turbine engine 110 through an associated inlet 160 of outer nacelle 150 and/or fan case assembly 114. As air 158 passes across fan blades 144, a first portion 162 of air 158 is directed or routed into bypass airflow passage 156 and a second portion 164 of air 158 is directed or routed into core air flow path 137, or more specifically into LP compressor 122. The ratio between first portion 162 of air 158 and second portion 164 of air 158 is commonly known as a bypass ratio. The pressure of second portion 164 of air 158 is then increased as it is routed through HP compressor 124 and into combustion section 126, where it is mixed with fuel and burned to provide combustion gases 166.

Combustion gases 166 are routed through HP turbine 128 where a portion of thermal and/or kinetic energy from combustion gases 166 is extracted via sequential stages of HP turbine stator vanes 168 that are coupled to outer casing 118 and HP turbine rotor blades 170 that are coupled to HP spool or shaft 134, thus causing HP spool or shaft 134 to rotate, thereby supporting operation of HP compressor 124. Combustion gases 166 are then routed through LP turbine 130 where a second portion of thermal and kinetic energy is extracted from combustion gases 166 via sequential stages of LP turbine stator vanes 172 that are coupled to outer casing 118 and LP turbine rotor blades 174 that are coupled to LP spool or shaft 136, thus causing LP spool or shaft 136 to rotate, thereby supporting operation of LP compressor 122 and/or rotation of fan 142. Combustion gases 166 are subsequently routed through exhaust nozzle section 132 of gas turbine engine core 116 to provide propulsive thrust. Simultaneously, the pressure of first portion 162 of air 158 is increased as first portion 162 of air 158 is routed through bypass airflow passage 156, including through outlet guide vane assembly 152 before it is exhausted from a fan nozzle exhaust section 176 of gas turbine engine 110, also providing propulsive thrust. HP turbine 128, LP turbine 130, and exhaust nozzle section 132 at least partially define a hot gas path 178 for routing combustion gases 166 through gas turbine engine core 116.

In some embodiments, gas turbine engine 110 includes a pitch change mechanism 180, and a pitch of fan blades 144 may be varied about a pitch axis P using pitch change mechanism 180. Gas turbine engine 110 may also include one or more gearboxes 182. In such instances, when these components are present they may also be coupled in flow communication with heat exchanger 140, which also provides cooling for oil flows through pitch change mechanism 180 and/or one or more gearboxes 182.

It should be appreciated, however, that exemplary gas turbine engine 110 depicted in FIG. 1 is by way of example only, and that in other exemplary embodiments, gas turbine engine 110 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, for example, a turboprop engine, a military purpose engine, a core engine, an auxiliary power unit, a test rig, and a marine or land-based aero-derivative engine.

Figure 2:
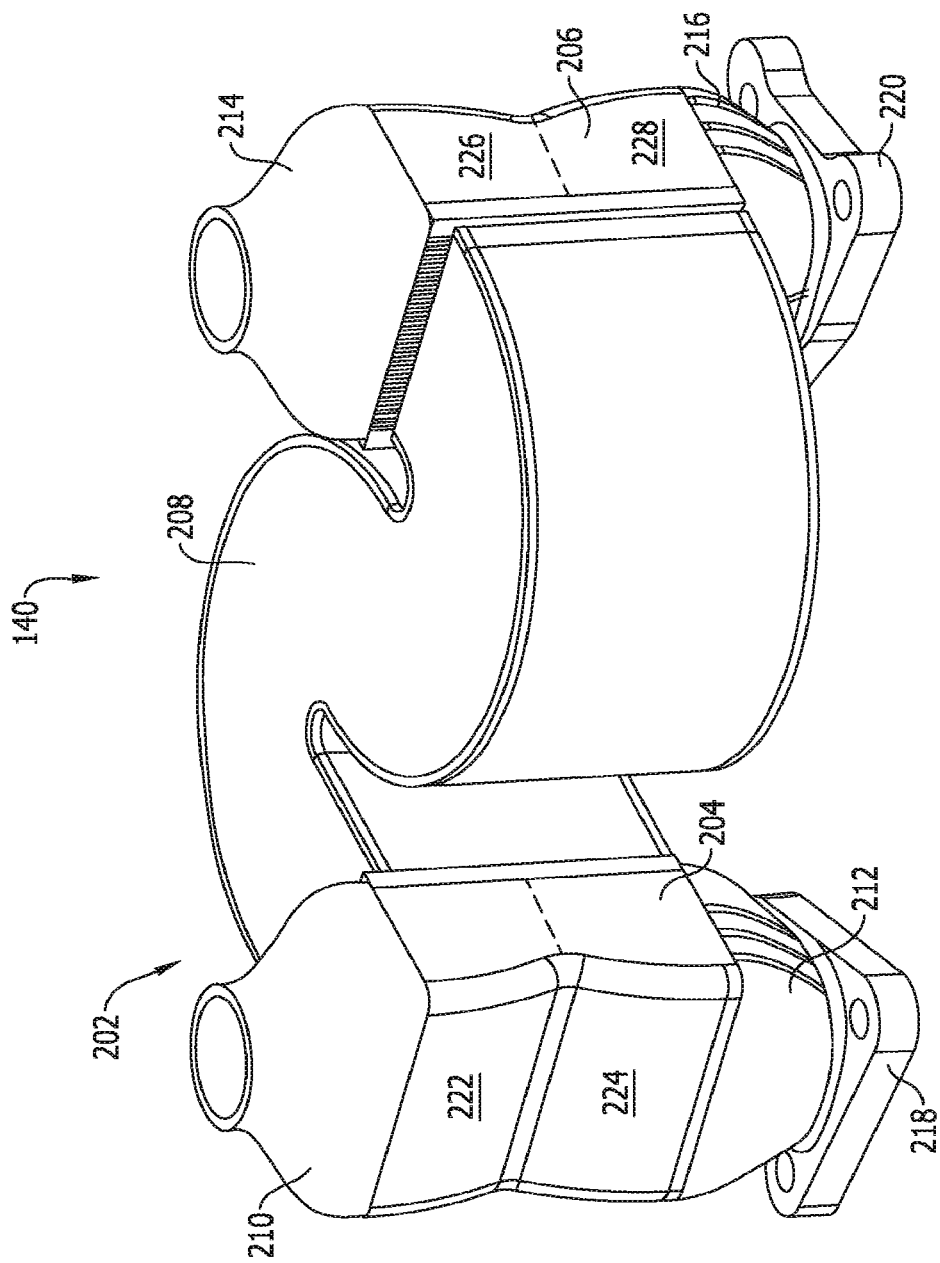

FIG. 2 is a perspective view of heat exchanger 140 having a heat exchanger body 202. In the example embodiment, heat exchanger 140 includes a first heat exchanger manifold 204 and a second heat exchanger manifold 206. Heat exchanger 140 also includes a heat exchanger core 208 extending between first heat exchanger manifold 204 and second heat exchanger manifold 206. In various embodiments, heat exchanger core 208 includes a plurality of columnar passages extending between an inlet plenum of heat exchanger core 208 and an outlet plenum of heat exchanger core 208. In some embodiments, the columnar passages are formed via manufacturing methods using layer-by-layer construction or additive fabrication including, but not limited to, Selective Laser Sintering (SLS), 3D printing, such as by inkjets and laserjets, Sterolithography (SLS), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), and the like. A plurality of working fluid passages extends along a serpentine path between first heat exchanger manifold 204 and second heat exchanger manifold 206. Although shown in FIG. 2 as having a serpentine shape, heat exchanger core 208 can also be shaped in a simple arcuate path, a complex arcuate path, a zig-zag path, an undulating path, a straight path, a linear path, or any other shape path that facilitates heat exchanger 140 in performing the functions described herein.

A transition member is formed on each end of first heat exchanger manifold 204 and second heat exchanger manifold 206. A first transition member 210, a second transition member 212, a third transition member 214, and a fourth transition member 216 all channel flows into or out of a respective one of first heat exchanger manifold 204 and second heat exchanger manifold 206. Second transition member 212 and fourth transition member 216 are formed with a respective connecting flange 218, 220 configured to couple to a component or piping.

In various embodiments, first heat exchanger manifold 204 includes a first header 222 that extends between heat exchanger core 208 and first transition member 210. First heat exchanger manifold 204 also includes a second header 224 that extends between heat exchanger core 208 and second transition member 212. Second heat exchanger manifold 206 includes a third header 226 that extends between heat exchanger core 208 and third transition member 214. Second heat exchanger manifold 206 also includes a fourth header 228 that extends between heat exchanger core 208 and fourth transition member 216. Headers 222, 224, 226, and 228 are configured to channel respective flows of coolant or working fluid between heat exchanger core 208 and first transition member 210, second transition member 212, third transition member 214, and fourth transition member 216, respectively.

Figure 3:
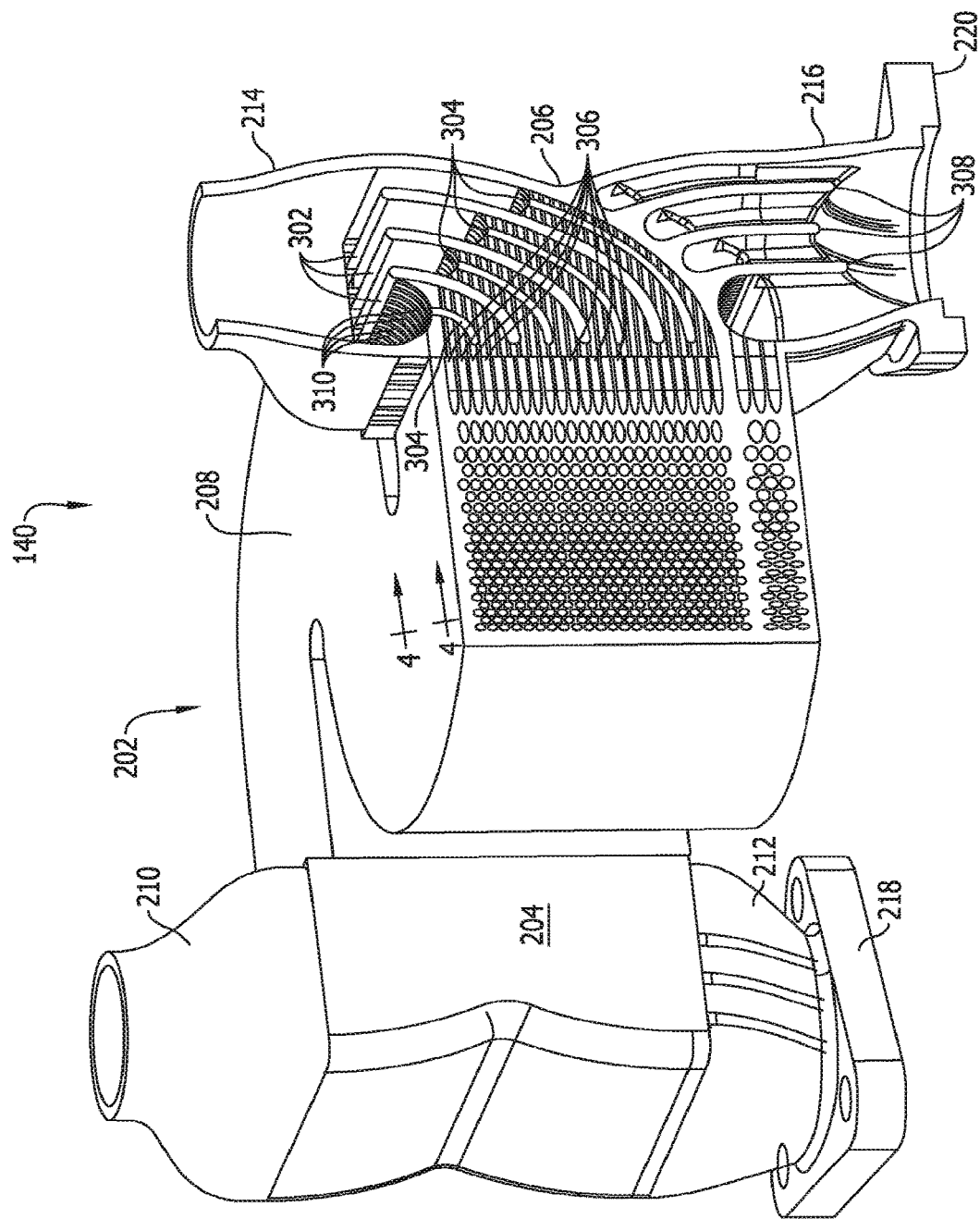
Figure 4:
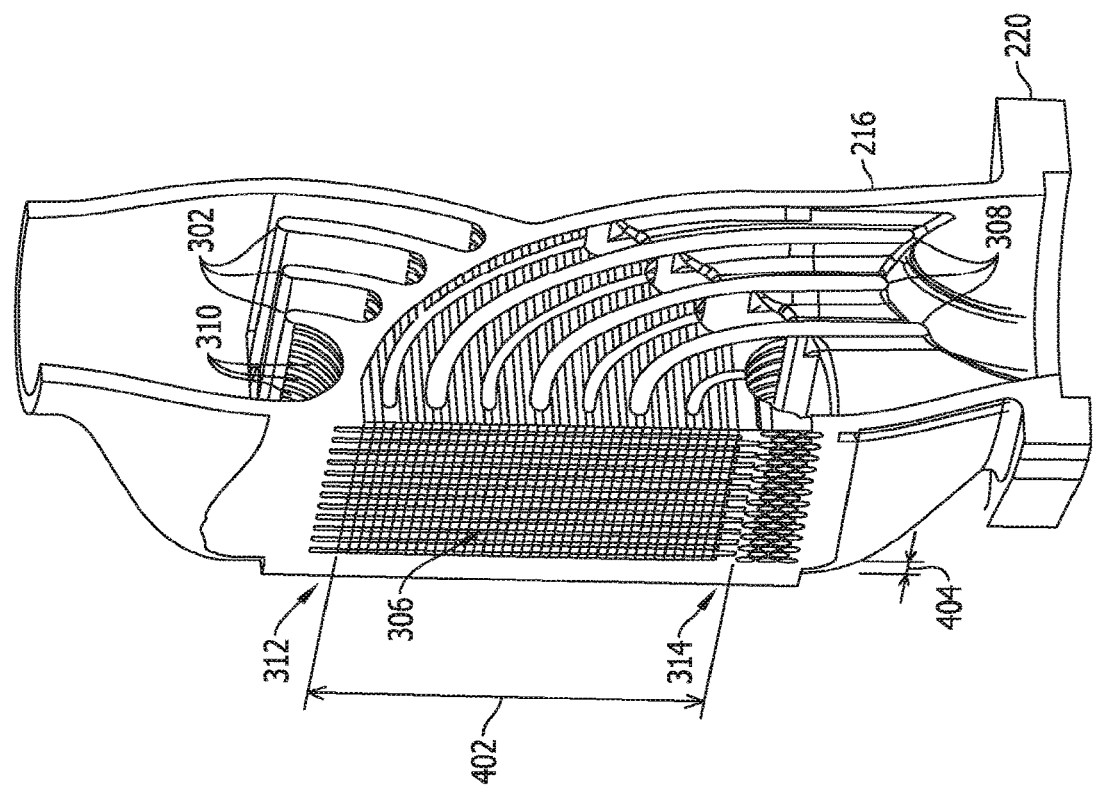

FIG. 3 is a partial cutaway view of heat exchanger 140 (shown in FIG. 1). FIG. 4 is a cutaway view of the internal passages of second heat exchanger manifold 206. In the example embodiment, the cutaway view of FIG. 4 is looking into second heat exchanger manifold 206 from heat exchanger core 208. With reference to FIGS. 3 and 4, in the example embodiment, second heat exchanger manifold 206 includes a plurality of major stiffeners 302 and a plurality of minor stiffeners 304 that also function as flow guides channeling working fluid, such as oil from plurality of bearing assemblies 138 (shown in FIG. 1), or coolant fluid, such as fuel routed for cooling purposes, from a plurality of core flow passages 306 in heat exchanger core 208 through second heat exchanger manifold 206 and into third transition member 214. In the example embodiment, plurality of major stiffeners 302 and plurality of minor stiffeners 304 are formed monolithically with second heat exchanger manifold 206 and third transition member 214 by, for example, an additive manufacturing process. In various embodiments, second heat exchanger manifold 206 and fourth transition member 216 also have similarly formed stiffeners 308 that also function as flow guides. Although not shown in FIG. 3, first heat exchanger manifold 204 and first transition member 210, and first heat exchanger manifold 204 and second transition member 212 also have similarly formed stiffeners that also function as flow guides. A plurality of manifold flow passages 310 extend plurality of core flow passages 306 into second heat exchanger manifold 206.

Core flow passages 306 are divided into a first set 312 of core flow passages 306 and into a second set 314 of core flow passages 306. In one embodiment, first set 312 of core flow passages 306 are configured as a plurality of coolant fluid passages and second set 314 of core flow passages 306 are configured as a plurality of working fluid passages. In other embodiments, first set 312 of core flow passages 306 are configured as a plurality of working fluid passages and second set 314 of core flow passages 306 are configured as a plurality of coolant fluid passages. Core flow passages 306 are configured as a plurality of coolant fluid passages that extend along the path of heat exchanger core 208 in thermal conduction communication with core flow passages 306 configured as a plurality of working fluid passages. Additionally, first set 312 of core flow passages 306 and second set 314 of core flow passages 306 may be arranged as counter-flow or opposed flow or may be arranged as parallel flow. As used herein, counter-flow or opposed flow refers to flow through adjacent first set 312 of core flow passages 306 and second set 314 of core flow passages 306 being in opposite directions. Parallel flow refers to flow through adjacent first set 312 of core flow passages 306 and second set 314 of core flow passages 306 being in the same direction. A height 402 of core flow passages 306 is significantly greater than a width 404 of core flow passages 306. In one embodiment, height 402 of core flow passages 306 is approximately ten times greater than width 404. In another embodiment, height 402 of core flow passages 306 is approximately twenty times greater than width 404. In still other embodiments, height 402 of core flow passages 306 is approximately forty times greater than width 404. The greater height than width of core flow passages 306 increases a surface area of heat transfer surfaces between adjacent core flow passages 306. In various embodiments, first set 312 of core flow passages 306 and second set 314 of core flow passages 306 have individual core flow passages 306 that are sized differently than remaining core flow passages 306 of first set 312 of core flow passages 306 and second set 314 of core flow passages 306.

In the example embodiment, first heat exchanger manifold 204, second heat exchanger manifold 206, first set 312 of core flow passages 306 and second set 314 of core flow passages 306 are formed monolithically of a sintered material in an additive manufacturing process. As used herein, "additive manufacturing" refers to any process which results in a three-dimensional object and includes a step of sequentially forming the shape of the object one layer at a time. Additive manufacturing processes include, for example, three dimensional printing, laser-net-shape manufacturing, direct metal laser sintering (DMLS), direct metal laser melting (DMLM), selective laser sintering (SLS), plasma transferred arc, freeform fabrication, and the like. One exemplary type of additive manufacturing process uses a laser beam to sinter or melt a powder material. Additive manufacturing processes can employ powder materials or wire as a raw material. Moreover, additive manufacturing processes can generally relate to a rapid way to manufacture an object (article, component, part, product, etc.) where a plurality of thin unit layers are sequentially formed to produce the object. For example, layers of a powder material may be provided (e.g., laid down) and irradiated with an energy beam (e.g., laser beam) so that the particles of the powder material within each layer are sequentially sintered (fused) or melted to solidify the layer. As used herein, sintered material comprises a sintered structure or a partial sintered structure. In various embodiments, the sintered material comprises any of an elemental metal, a metal alloy, a ceramic, a plastic, and any combination thereof.

Figure 5:
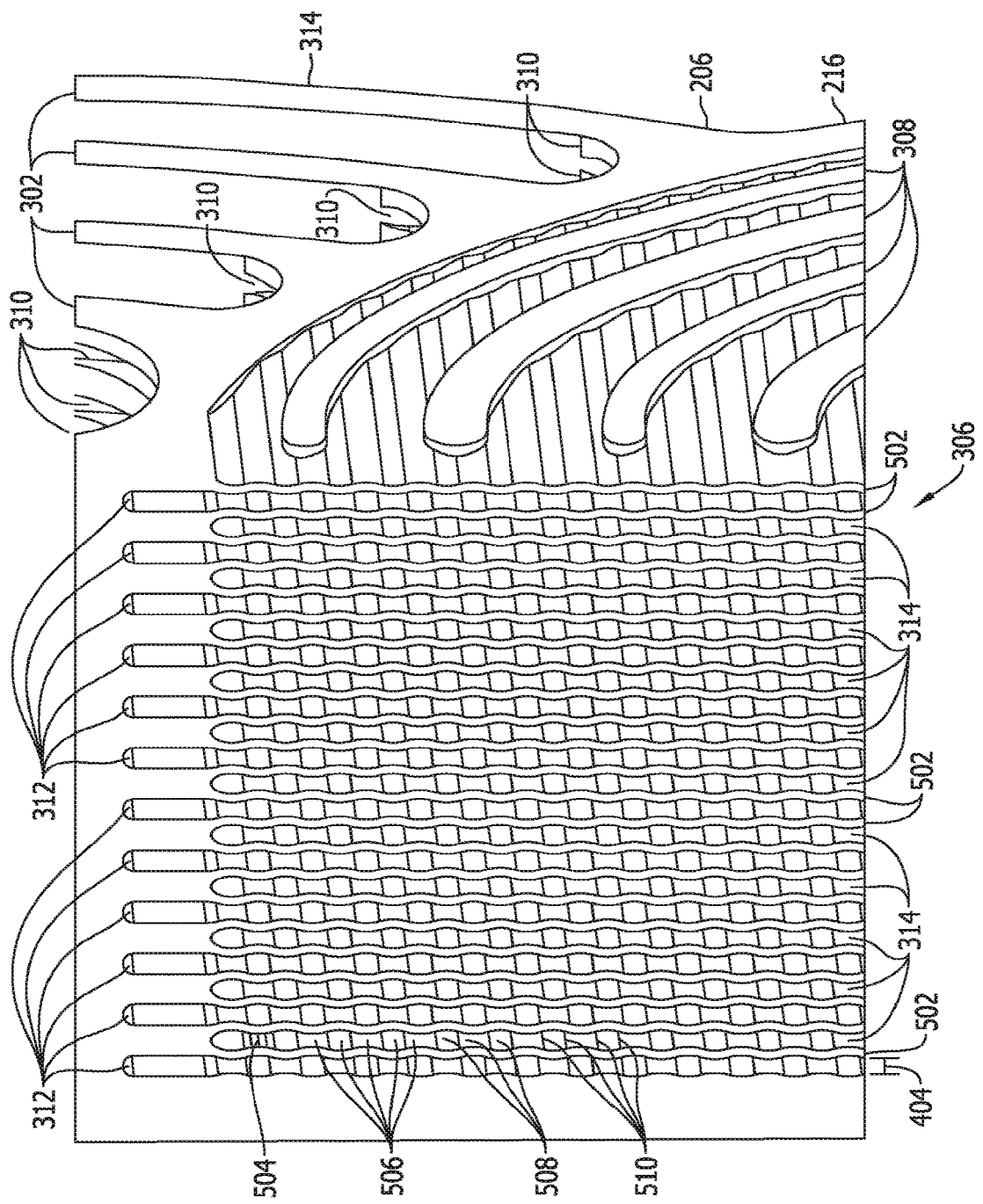

FIG. 5 is an enlarged cutaway view of the internal passages of second heat exchanger manifold 206. In the example embodiment, first set 312 of core flow passages 306 and second set 314 of core flow passages 306 are separated by a plurality of core passage walls 502. In the example embodiment, each plurality of core passage walls 502 is corrugated or has an undulating cross-section. In other embodiments, plurality of core passage walls 502 are flat. In still other embodiments, plurality of core passage walls 502 have surface features that facilitate increasing heat transfer between first set 312 of core flow passages 306 and second set 314 of core flow passages 306 through at least one of flow mixing, turbulation, and fin effect. The surface features may be embodied in, for example, but not limited to a plurality of flow guides 504, a plurality of dimples 506, a plurality of bumps 508, and a plurality of spikes 510.

Figure 6:
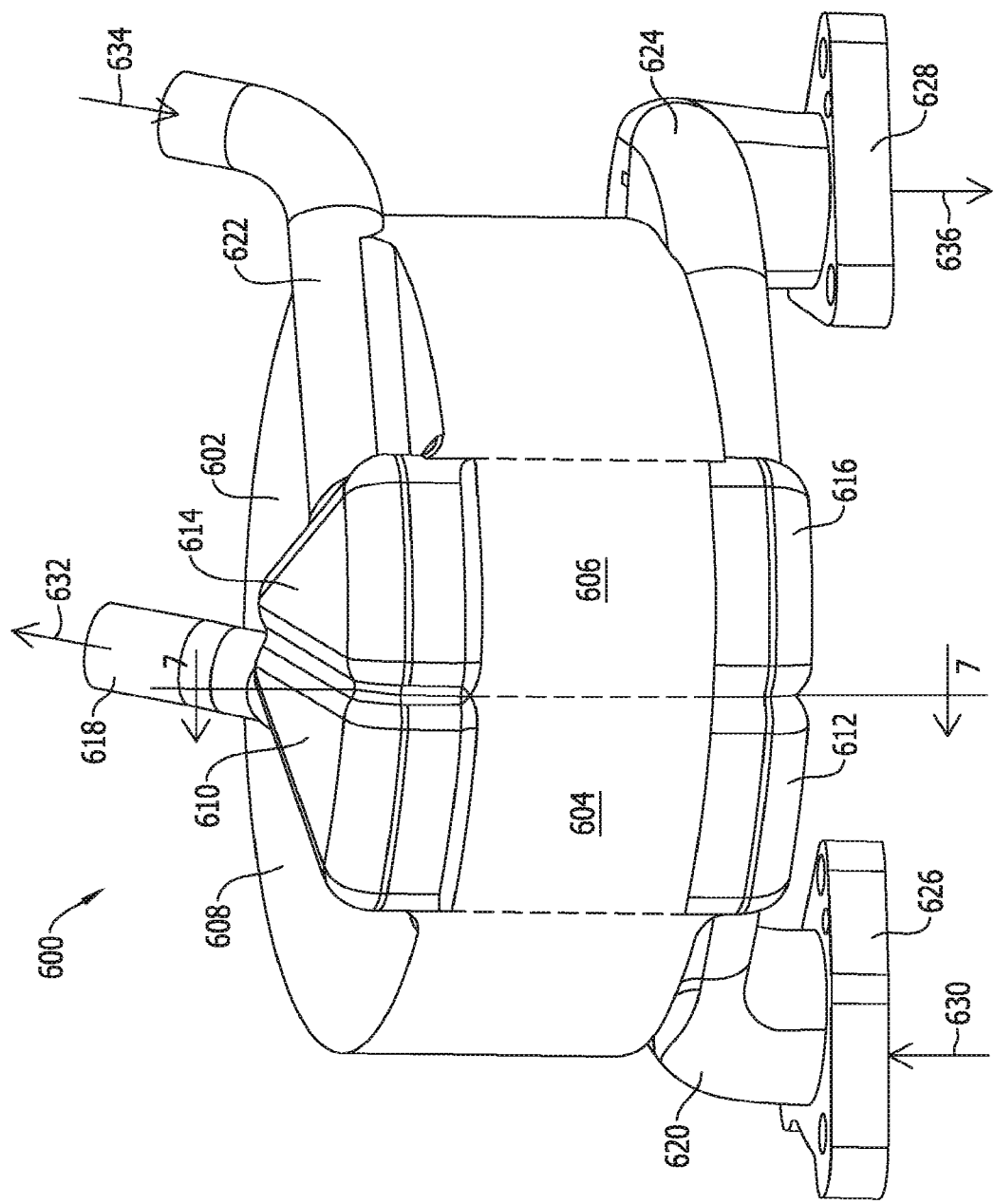

FIG. 6 is a perspective view of another embodiment of a heat exchanger 600 having a heat exchanger body 602. In the example embodiment, heat exchanger 600 includes a first heat exchanger manifold 604 and a second heat exchanger manifold 606. Heat exchanger 600 also includes a heat exchanger core 608 extending between first heat exchanger manifold 604 and second heat exchanger manifold 606. In FIG. 6, heat exchanger core 608 is shaped in a simple arcuate path forming a portion of a circular path between first heat exchanger manifold 604 and second heat exchanger manifold 606. In other embodiments, heat exchanger core 608 is formed in other shapes, such as, but not limited to a complex arcuate shape, or any other shape that facilitates heat exchanger 600 in performing the functions described herein.

A transition member is formed on each end of first heat exchanger manifold 604 and second heat exchanger manifold 606. A first transition member 610, a second transition member 612, a third transition member 614, and a fourth transition member 616 all channel flows into or out of a respective one of first heat exchanger manifold 604 and second heat exchanger manifold 606. A first connecting pipe 618 is coupled to or formed with first transition member 610. A second connecting pipe 620 is coupled to or formed with second transition member 612. A third connecting pipe 622 is coupled to or formed with third transition member 614, and a fourth connecting pipe 624 is coupled to or formed with fourth transition member 616. Second connecting pipe 620 and fourth connecting pipe 624 are formed with a respective connecting flange 626, 628 that are coupled to or formed with second connecting pipe 620 and fourth connecting pipe 624 respectively, and are configured to couple to a component or piping. In the example embodiment of a cross-flow or opposed-flow heat exchanger configuration, a flow of a first fluid 630, 632 enters heat exchanger 600 through second connecting pipe 620 and exits heat exchanger 600 through first connecting pipe 618. A flow of a second fluid 634, 636 enters heat exchanger 600 through third connecting pipe 622 and exits heat exchanger 600 through fourth connecting pipe 624. Heat exchanger 600 may, in other embodiments, be configured in a parallel flow configuration. In the parallel flow configuration, a direction of flow of one of flow of first fluid 630, 632 and flow of second fluid 634, 636 are reversed.

Figure 7:
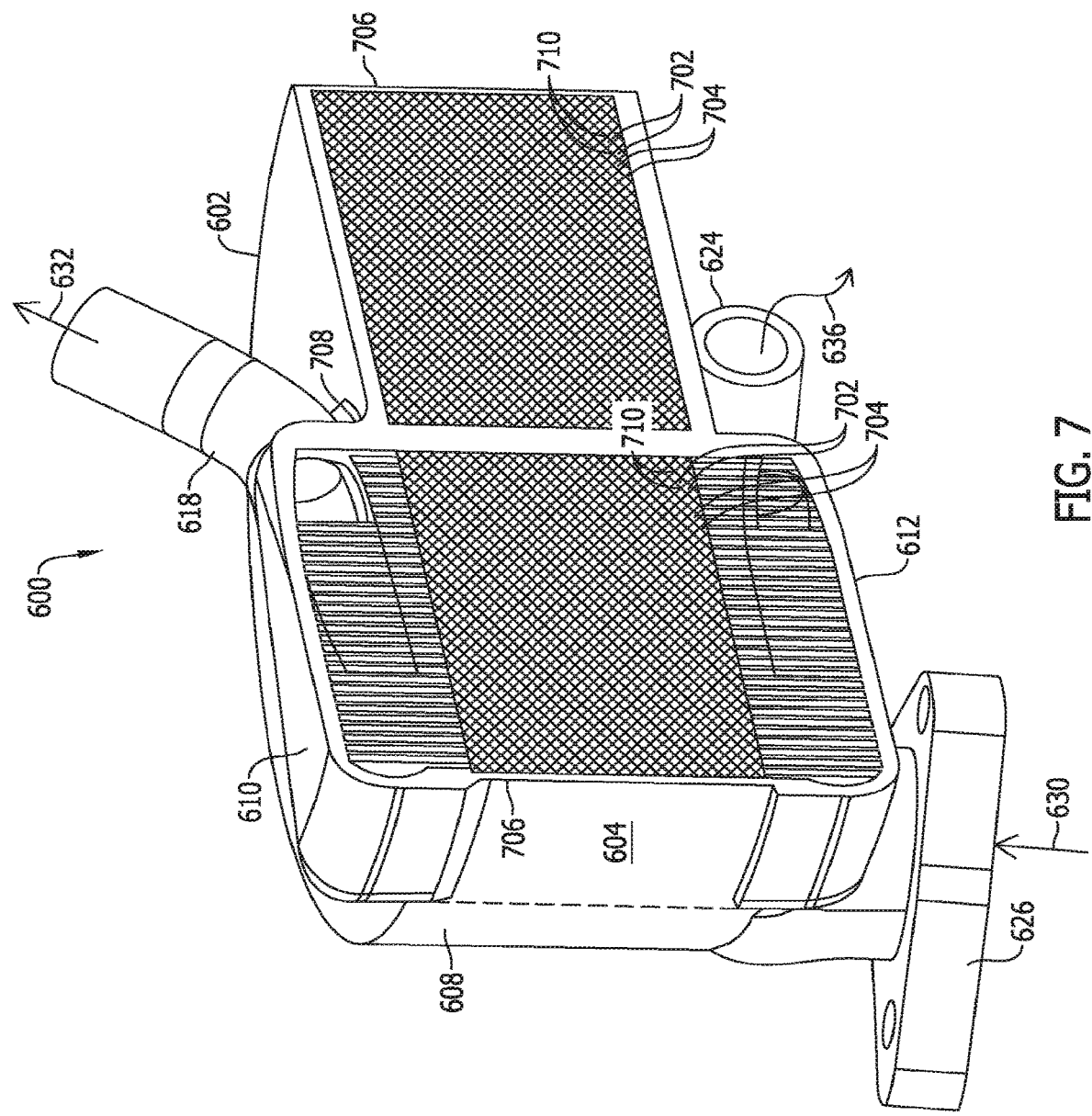

FIG. 7 is a cutaway view of heat exchanger 600 taken along line 7-7 (shown in FIG. 6). In the example embodiment, a first set of a plurality of core flow passages 702 and a second set of a plurality of core flow passages 704 alternate adjacent to one another from an outer radial periphery 706 to an inner radial periphery 708 of heat exchanger 600. First set of plurality of core flow passages 702 and second set of plurality of core flow passages 704 are formed of columnar sidewalls 710 simultaneously and seallessly in an additive manufacturing process. Accordingly, the physical structure of columnar sidewalls 710 is indicative of a sintered or a full melt additive manufacturing process. In various embodiments, columnar sidewalls 710 have a surface contour or surface features, similar to bumps, spikes, etc. shown in FIG. 5, that increase a strength of columnar sidewalls 710, increase a surface area of columnar sidewalls 710, and/or reduce laminar flow through the first set of the plurality of core flow passages 702 and the second set of the plurality of core flow passages 704.

Figure 8:
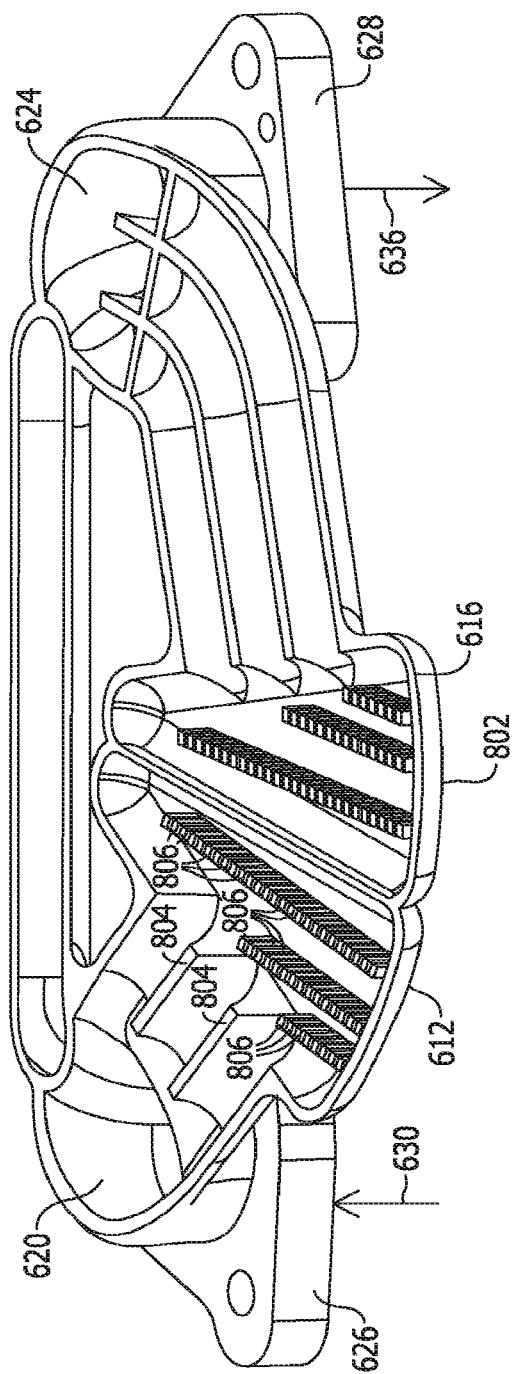

FIG. 8 is a cutaway view of a first manifold 802 of heat exchanger 600 (shown in FIG. 6). With reference to FIGS. 6-8, in the example embodiment, first manifold 802 may also be referred to as "lower" manifold 802 because of the orientation of heat exchanger 600 as shown in FIGS. 6-8. However, heat exchanger 600 may be used in a plurality of different orientations, including orientations where first manifold 802 is positioned higher than the rest of heat exchanger 600. In the example embodiment, second connecting pipe 620 is configured to receive a flow of fluid, for example, flow of first fluid 630, 632 and channel flow of first fluid 630, 632 into second transition member 612 where a plurality of major guide vanes 804 channel flow of first fluid 630, 632 in a circumferential direction C. Flow of first fluid 630, 632 is further directed to a plurality of minor guide vanes 806 that facilitate directing flow of first fluid 630, 632 into one of the first set of the plurality of core flow passages 702 and the second set of the plurality of core flow passages 704 and facilitate turning flow of first fluid 630, 632 in axial direction A into heat exchanger core 608.

Additionally, plurality of major guide vanes 804 and plurality of minor guide vanes 806 also provide additional structural integrity for heat exchanger 600 and heat exchanger core 608. Plurality of major guide vanes 804 and plurality of minor guide vanes 806 provide a stiffness or rigidity that permits operating the first set of the plurality of core flow passages 702 and the second set of the plurality of core flow passages 704 at significantly different pressures without bowing components out of plane. Plurality of major guide vanes 804 and plurality of minor guide vanes 806 also provide a reduction in a pressure drop of through the first set of the plurality of core flow passages 702 and the second set of the plurality of core flow passages 704 by facilitating turning, for example, flow of first fluid 630, 632 through a sharp 90° bend in second transition member 612. Plurality of major guide vanes 804 and plurality of minor guide vanes 806 allow flow of first fluid 630, 632 to turn into heat exchanger core 608 in a more efficient way that reduces a loss coefficient of flow of first fluid 630, 632 coming onboard heat exchanger core 608. Plurality of major guide vanes 804 and plurality of minor guide vanes 806 also facilitate the additive manufacturing process. In one embodiment, a recoater blade deposits and removes powder from the bed of the additive manufacturing machine. The action of the recoater blade during the forming of heat exchanger applies a lateral force to the structure being built up. Structures that are too thin may not be able to withstand the force applied and may collapse during the additive manufacturing process. Plurality of major guide vanes 804 and plurality of minor guide vanes 806 provide additional support and permit forming heat exchanger 600 with thin and tall walls.

The first set of the plurality of core flow passages 702 and the second set of the plurality of core flow passages 704 are curved around the circular profile of heat exchanger core 608. As such, a length of the first set of the plurality of core flow passages 702 and the second set of the plurality of core flow passages 704 are relatively longer the closer the first set of the plurality of core flow passages 702 and the second set of the plurality of core flow passages 704 run to outer radial periphery 706 and are relatively shorter the closer the first set of the plurality of core flow passages 702 and the second set of the plurality of core flow passages 704 run to inner radial periphery 708. The disparate lengths of the first set of the plurality of core flow passages 702 and the second set of the plurality of core flow passages 704 because the first set of the plurality of core flow passages 702 and the second set of the plurality of core flow passages 704 are running in parallel around circular heat exchanger core 608 may cause undesired effects. For example, the increased length increases head loss through the radially outermost of the first set of the plurality of core flow passages 702 and the second set of the plurality of core flow passages 704. Increased head loss creates disparate flow across heat exchanger core 608, which could affect a heat exchange capability of the first set of the plurality of core flow passages 702 and the second set of the plurality of core flow passages 704. Such effects can be mitigated by forming those core flow passages of first set of the plurality of core flow passages 702 and the second set of the plurality of core flow passages 704 that are positioned towards outer radial periphery 706 differently than those core flow passages of first set of the plurality of core flow passages 702 and the second set of the plurality of core flow passages 704 that are positioned towards inner radial periphery 708.

The above-described embodiments of a monolithically formed heat exchanger describe a cost-effective and reliable means for providing a sealless heat exchanger. More specifically, the methods and systems described herein facilitate forming the heat exchanger without seals or joints between components of the heat exchanger core or the heat exchanger and inlet and outlet headers and manifolds. In addition, the above-described methods and systems facilitate manufacturing the heat exchanger using additive manufacturing using guide vanes for strength and stability of the heat exchanger structure during operation but, also for manufacturability concerns. As a result, the heat exchangers described herein facilitate enhanced cooling of components in a cost-effective and reliable manner.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A heat exchanger comprising a heat exchanger body comprising:
   a first heat exchanger manifold including a first transition member and a second transition member, the first transition member including a plurality of first major stiffeners and a plurality of first minor stiffeners and the second transition member including a plurality of second stiffeners;
   a second heat exchanger manifold including third transition member and a fourth transition member, the third transition member including a plurality of third stiffeners and the fourth transition member including a plurality of fourth stiffeners; and
   a plurality of sidewalls extending along an at least partially arcuate path between the first heat exchanger manifold and the second heat exchanger manifold, the plurality of sidewalls separated by a flow gap forming a plurality of working fluid passages alternating with a plurality of coolant fluid passages in thermal conduction communication with the plurality of working fluid passages.

2. The heat exchanger of claim 1, wherein the plurality of first major stiffeners and the plurality of first minor stiffeners are arranged in an alternating manner such that the plurality of first minor stiffeners are positioned between adjacent first major stiffeners of the plurality of first major stiffeners.

3. The heat exchanger of claim 1, wherein each first minor stiffener of the plurality of first minor stiffeners has a length less than a length of an adjacent first major stiffener of the plurality of first major stiffeners.

4. The heat exchanger of claim 1, wherein a free end of each first minor stiffener of the plurality of first minor stiffeners terminates at a location closer to the plurality of sidewalls than a free end of each first major stiffener of the plurality of first major stiffeners.

5. The heat exchanger of claim 1, wherein the plurality of second stiffeners include a plurality of second major stiffeners and a plurality of second minor stiffeners.

6. The heat exchanger of claim 4, wherein the plurality of third stiffeners include a plurality of third major stiffeners and a plurality of third minor stiffeners, and wherein the plurality of fourth stiffeners include a plurality of fourth major stiffeners and a plurality of fourth minor stiffeners.

7. The heat exchanger of claim 1, wherein the plurality of first stiffeners and the plurality of second stiffeners have a curvature extending in opposite directions.

8. The heat exchanger of claim 1, wherein the plurality of third stiffeners and the plurality of fourth stiffeners have a curvature extending in opposite directions.

9. The heat exchanger of claim 1, wherein the first heat exchanger manifold includes a monolithically formed flange and the second heat exchanger manifold includes a monolithically formed flange.

10. The heat exchanger of claim 1, wherein at least one of the plurality of sidewalls comprises a plurality of surface features that increase heat transfer between the plurality of working fluid passages and the plurality of coolant fluid passages through at least one of flow mixing, turbulation, and fin effect, wherein at least one of the plurality of surface features extend into the flow gap.

11. The heat exchanger of claim 1, wherein the first heat exchanger manifold further comprises a working fluid inlet header and a coolant fluid outlet header, and the second heat exchanger manifold further comprises a working fluid outlet header and a coolant fluid inlet header.

12. The heat exchanger of claim 1, wherein the first heat exchanger manifold further comprises a working fluid inlet header and a working fluid outlet header, the second heat exchanger manifold further comprises a coolant fluid outlet header and a coolant fluid inlet header.

13. The heat exchanger of claim 1, further comprising a first header member formed monolithically with the heat exchanger body.

14. The heat exchanger of claim 13, further comprising a second header member formed monolithically with the heat exchanger body.

15. The heat exchanger of claim 1, wherein each of the plurality of working fluid passages is separated by core passage walls, each of the core passage walls have a corrugated cross section.

16. The heat exchanger of claim 15, wherein the plurality of first stiffeners and the plurality of second stiffeners of the first heat exchanger manifold direct a flow of fluid from the core passage walls through the first heat exchanger manifold.

17. The heat exchanger of claim 15, wherein the plurality of third stiffeners and the plurality of fourth stiffeners of the second heat exchanger manifold direct a flow of fluid from the core passage walls through the second heat exchanger manifold.

18. The heat exchanger of claim 10, wherein the surface features comprise one or more of a plurality of flow guides, a plurality of dimples, a plurality of bumps, and a plurality of spikes.

19. The heat exchanger of claim 1, wherein the plurality of sidewalls form a serpentine heat exchanger core between the first heat exchanger manifold and the second heat exchanger manifold.

20. The heat exchanger of claim 19, wherein the serpentine heat exchanger core is arranged in at least one of an arcuate path, a zig-zag path, an undulating path, a straight path, a linear path, or a combination thereof.

* * * * *